United States Patent
Saito et al.

(10) Patent No.: US 6,683,872 B1
(45) Date of Patent: Jan. 27, 2004

(54) VARIABLE RATE DIGITAL SWITCHING SYSTEM

(75) Inventors: Tadao Saito, Yokohama (JP); Hitoshi Aida, Kawasaki (JP); Terumasa Aoki, Kamifukuoka (JP); Udomkiat Bunworasate, Tokyo (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 09/363,648

(22) Filed: Jul. 30, 1999

(30) Foreign Application Priority Data

Jul. 31, 1998 (JP) .......... 10-217378

(51) Int. Cl.[7] .......... H04L 12/50; H04Q 11/00
(52) U.S. Cl. .......... 370/380; 370/389
(58) Field of Search .......... 370/380, 381, 370/382, 383, 384, 385, 386, 387, 389

(56) References Cited

U.S. PATENT DOCUMENTS

| | | | | |
|---|---|---|---|---|
| 4,833,670 A | * | 5/1989 | Lebizay et al. | 370/383 |
| 6,055,235 A | * | 4/2000 | Blanc et al. | 370/389 |
| 6,069,878 A | * | 5/2000 | Christensen | 370/263 |
| 6,259,699 B1 | * | 7/2001 | Opalka et al. | 370/398 |
| 6,275,491 B1 | * | 8/2001 | Prasad et al. | 370/389 |

* cited by examiner

Primary Examiner—Wellington Chin
Assistant Examiner—Chirag Shah
(74) Attorney, Agent, or Firm—Venable LLP; Chad C. Anderson

(57) ABSTRACT

There is provided a variable rate digital switching system comprising steps of: arranging a plurality of incoming TDM buses and a plurality of sending TDM buses in lattice form; providing cross-point buffers at cross-points of the incoming buses and the sending buses; connecting the cross-point buffers belonging to respective sending TDM buses to respective scheduler; connecting respective contents analyzer to respective scheduler; checking frame headers of input TDM frames by respective cross-point buffers, thereby buffering only data of time slot of destined and belonged sending bus and transmitting contents of the frame header to the contents analyzer; checking the frame header by the contents analyzer, thereby deciding the contents of data stored in the respective cross-point buffers on the own-belonged sending TDM bus, and informing them to the scheduler; performing the scheduling by the scheduler as for how time slots in the sending TDM frame is allocated in respective cross-point buffers according to the contents of the frame header and an amount of data stored in respective cross-point buffer; and inputting in turn the buffered data in the own-allocated time slots of the sending TDM frame according to the scheduling by respective cross-point buffer, and outputting them from the sending TDM bus.

7 Claims, 5 Drawing Sheets

1: switch
2: incoming line TDM buses
3: sending line TDM buses
4: cross-point buffers
5: contents analyzers
6: schedulers 1: switch
2: incoming line TDM buses
3: sending line TDM buses
4: cross-point buffers
5: contents analyzers
6: schedulers

VARIABLE RATE DIGITAL SWITCHING SYSTEM

BACKGROUND OF THE INVENTION

1. Field of the Invention

The present invention relates to a digital switching system, and more particularly to a variable rate digital switching system for switching variable rate data traffic such as video traffic.

2. Related Art Statement

As the known digital switching system, TDM (Time division Multiplexing) switch and an ATM (Asynchronous Transfer Mode) switch are broadly used.

S-switch (Space-switch) is the typical TDM switch. In the S-switch, data for a plurality of calls are being time division multiplexed, and are transmitted in a TDM frame as a unit. The TDM frame is comprised of time slots having a length of about 1 octet, and the TDM frame period is about 125 $\mu$s. In the TDM frame, the numbers of the time slots assigned to each of the calls and those positions are not changed during the establishment of the connection. FIG. 1 is a schematic view showing a principle of the S switch. The S switch comprises time-division gates provided at cross-points of input lines and output lines arranged in a lattice form, and control memories for controlling the time-division gates. The S switch switches the TDM frames between the input lines and the output lines by switching the time-division gates at a high speed, with a timeslot as a unit, with being multiplexed. Each of the timeslots in the input TDM frame is moved to the timeslot in the output TDM frame on the output line of destination through the time-division gate specified by the control memory. Then, the temporal position of the timeslot is kept so that the temporal position on the input line is identical with the temporal position on the output line. The control memories are provided at every output line and store schedules in which the time-division gates are opened to pass the time slot.

The TDM switch has an advantage that once the connection is setup, a delay assurance and a loss rate assurance can be guaranteed without performing a special control such as a flow control, a vergence control, etc. The TDM switch is now mainly used for a speech communication imposed with a strict delay assurance.

However, the TDM switch has following problems. One problem is that a maximum rate of the TDM bus or a maximum rate of a RAM restricts increasing a capacity of the TDM switch. Furthermore, as the number of input lines increases, an establishment of a synchronization of the input time slots becomes more difficult so that it is difficult to increase the capacity more than some 10 Gbps.

Another problem is that it is difficult to handle deal with multiple rate data traffic, since the TDM switch is means for switching efficiently same rate data traffic, so that the TDM switch cannot operate efficiently when there is traffic having various requiring rates, and thus, it is difficult to handle the multi-rate traffic, that is, delay of the timeslots becomes increased.

Further problem is that it is difficult to handle variable rate data traffic, since in the current TDM switching networks, in order to handle the variable rate traffic, the time slots must be required at maximum rate of the traffic, and thus the transmission efficiency becomes very worse. For example, in addition to the speech traffic, video traffic is imposed with the strict delay assurance, too. An MPEG2 is a typical video coding system. Coding due to the MPEG2 produces usually variable rate traffic. FIG. 3 is a graph representing a distribution of frame sizes of the MPEG2 stream. Assuming that an average available band of the variable rate traffic is about 1 Mbps and a maximum rate of the same is about 5 Mbps, in the known TDM switching system, the connection must be set to about 5 Mbps as the maximum available band. However, because the average available band is about 1 Mbps, the traffic band of about 4 Mbps becomes wasted.

Cross-point buffer switch is the typical ATM switching system. FIG. 2 is a schematic view showing a principle of the cross-point buffer switch. The cross-point buffer switch comprises buffers each provided at cross-points between input lines and output lines arranged in a lattice form. Address filters are each followed by the buffers. Output control circuits are each connected to the output lines. In the cross-point buffer switch, data for a plurality of calls are being time division multiplexed, and are transmitted in an ATM cell as a unit. The ATM cell has a length of 53 bytes, and comprises a header having a length of 5 bytes and a payload having a length of 48 bytes. Now, using the buffer $B_{ij}$ connected to the input port $I_i$ and the output port $O_j$ describes the operation of the cross-point buffer switch. The address filter $F_{ij}$ checks the header of the ATM cell inputted from the input line $I_i$ and stores only the ATM cells destined for the output line $O_j$ into the buffer $B_{ij}$. When the cells to be sent are being storing in the buffer $B_{ij}$, the buffer $B_{ij}$ requests a permission for sending the cells to the output control circuit $C_j$. The output control circuit $C_j$ requires the buffer $B_{ij}$ to send the ATM cells in consideration of all requests of buffers related to output line $O_j$.

In the known ATM switch, because of the subdivision of the stream into the small ATM cells, an overhead caused by a cell assemble/disassemble and addition of the header becomes very large, and the switching speed becomes unnecessarily high. The known ATM switch also has a drawback that because the header is added to every ATM cell, high speed header processing is required. Moreover, for example, in case the of the video traffic, when one ATM cell is lost, the quality of the picture can be very degraded. Furthermore, because the ATM switch cannot distinguish the types of the data contained in the ATM cells, actively processing is very difficult in the switch level. Therefore, controls in upper layers can be complicated.

SUMMARY OF THE INVENTION

It is an object of the present invention to avoid the problems of the above conventional switching system.

It is an object of the present invention to provide a variable rate digital switching system suitable for handling efficiently the traffic imposed with the strict delay assurance, in particularly the video traffic.

According to the invention, there is provided a variable rate digital switching system comprising steps of:

arranging a plurality of incoming TDM buses and a plurality of sending TDM buses in lattice form;

providing cross-point buffers at cross-points of the incoming buses and the sending buses;

connecting the cross-point buffers belonging to respective sending TDM buses to respective scheduler;

checking frame header of input TDM frames by respective cross-point buffers, thereby buffering only data of time slot of destined and belonged sending bus and transmitting contents of the frame header to the scheduler;

performing the scheduling by the scheduler as for how time slots in the sending TDM frame is allocated in respective cross-point buffers according to the contents of the frame header; and inputting in turn the buffered data in the own-allocated time slots of the sending TDM frame according to the scheduling by the respective cross-point buffer, and outputting them from the sending TDM bus.

In this way, if the number of the input lines is increased, because the cross-point buffers can absorb slight time lag among the time slots, the capacity can be increased easier than the known TDM switching system.

In the variable rate digital switching system according to the invention, because the frame header contains the information about the positions of the time slots in the TDM frame, in the variable rate traffic, the connection dose not need to be set at the maximum rate. If too large amount of the data is inputted into the switch, a plurality of the TDM time slots can be assigned to transmit. Therefore, the variable rate traffic can be switched efficiently.

According to the invention, there is provided a variable rate digital switching system comprising steps of:

arranging a plurality of incoming TDM buses and a plurality of sending TDM buses in lattice form;

providing cross-point buffers at cross-points of the incoming buses and the sending buses;

connecting the cross-point buffers belonging to respective sending TDM buses to respective scheduler;

connecting respective contents analyzer to respective scheduler;

checking frame headers of input TDM frames by respective cross-point buffers, thereby buffering only data of time slot of destined and belonged sending bus and transmitting contents of the frame header to the contents analyzer;

checking the frame header by the contents analyzer, thereby deciding the contents of data stored in the respective cross-point buffers on the own-belonged sending TDM bus, and informing them to the scheduler;

performing the scheduling by the scheduler as for how time slots in the sending TDM frame is allocated in respective cross-point buffers according to the contents of the frame header and an amount of data stored in respective cross-point buffer; and inputting in turn the buffered data in the own-allocated time slots of the sending TDM frame according to the scheduling by respective cross-point buffer, and outputting them from the sending TDM bus.

In this way, the scheduling can be determined with considering the types of data containing in the time slots. For example, in case of the MPEG2, the MPEG2 stream contains I picture, P picture and B picture. If the B picture is lost, the quality of the image is less degraded, whereas if the I picture is lost, the quality of the image is much degraded. Thus, the I picture should be given a priority that is higher than that given to the B picture. According to the invention, the contents analyzer can distinguish the types of the picture and assign the priority levels depending on the types of the picture to the time slots.

In a preferable embodiment of the variable rate digital switching system according to the invention, the scheduler determines the scheduling in that the time slots in the output TDM frame are assigned in turn from the cross-point buffers of the longest length of queue for the cross-point buffers of the sending line. In this way, the time slot loss caused by the overflow of the buffer is minimized.

In another preferable embodiment of the variable rate digital switching system according to the invention, the scheduler determines the scheduling in that the timeslots in the output TDM frame assigned are in turn from the cross-point buffers of the shortest length of queue for the cross-point buffers of the sending line. In this way, the average of the buffering delay of the time slot is minimized.

In further preferable embodiment of the variable rate digital switching system according to the invention, the scheduler determines the scheduling according to the round robin method for the cross-point buffers of the sending line. In this way, the maximum delay time of the timeslot can be guaranteed.

In further preferable embodiment of the variable rate digital switching system according to the invention, the scheduler determines randomly the scheduling for the cross-point buffers of the sending line. In this way, the scheduling process becomes most simple.

In further preferable embodiment of the variable rate digital switching system according to the invention, the time slot length of the TDM frame is 16 kbit and the frame period of the TDM frame is a divisor of a video frame period of an input video signal contained in the TDM frames. In this way, in the video traffic, the video frame period can be corresponded to the TDM frame period.

DESCRIPTION OF THE PREFERRED EMBODIMENTS

Figure 1:
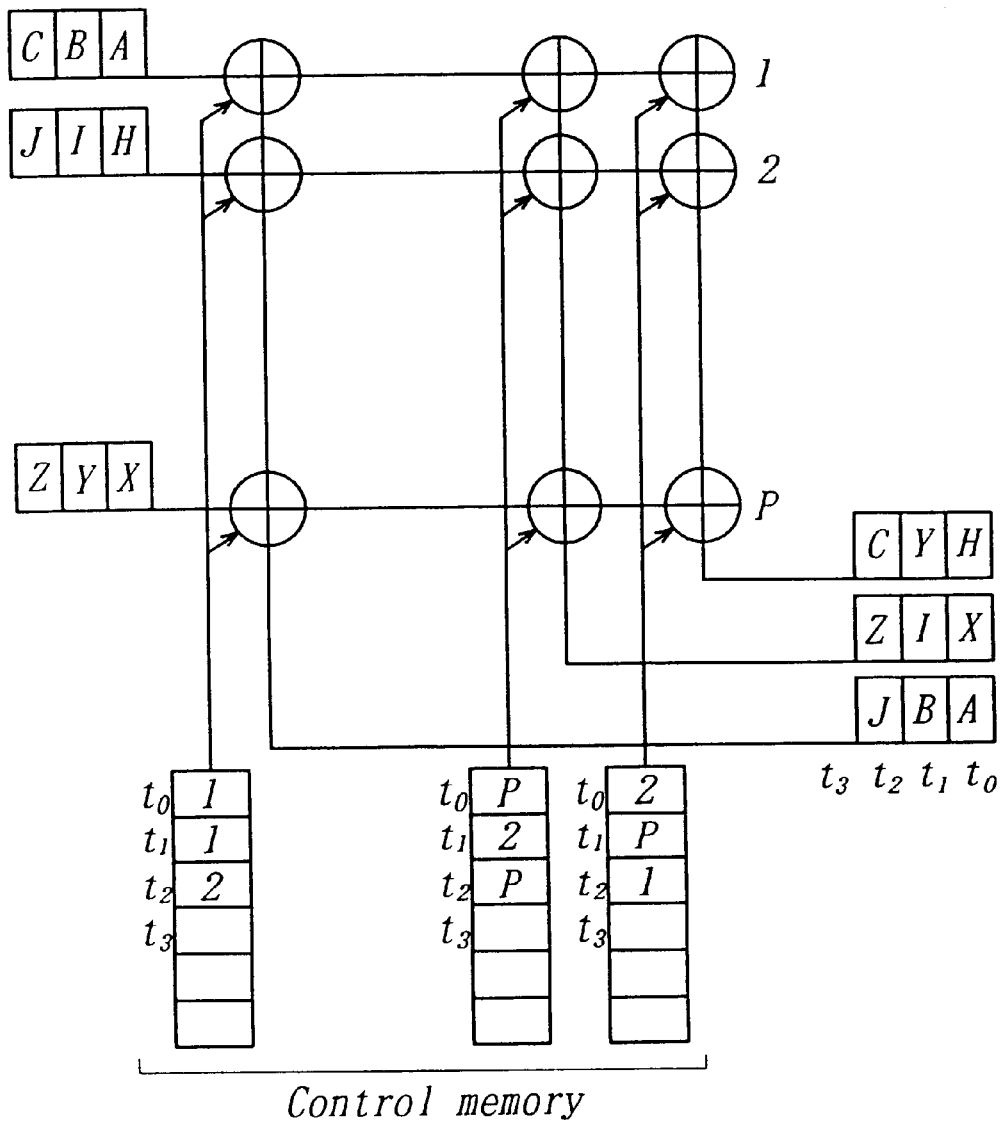
FIG. 1 is a schematic view showing a principle of a known S switch.
Figure 2:
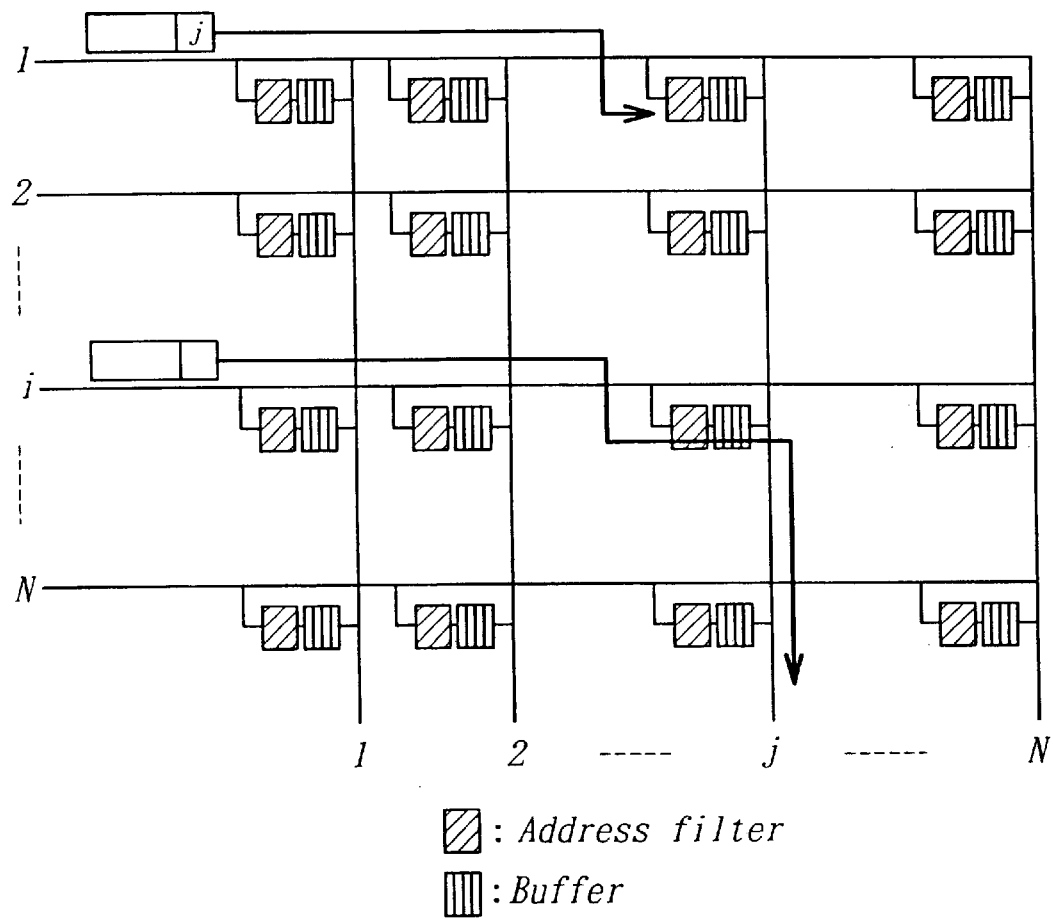
FIG. 2 is a schematic view showing a principle of a known cross-point buffer switch.
Figure 3:
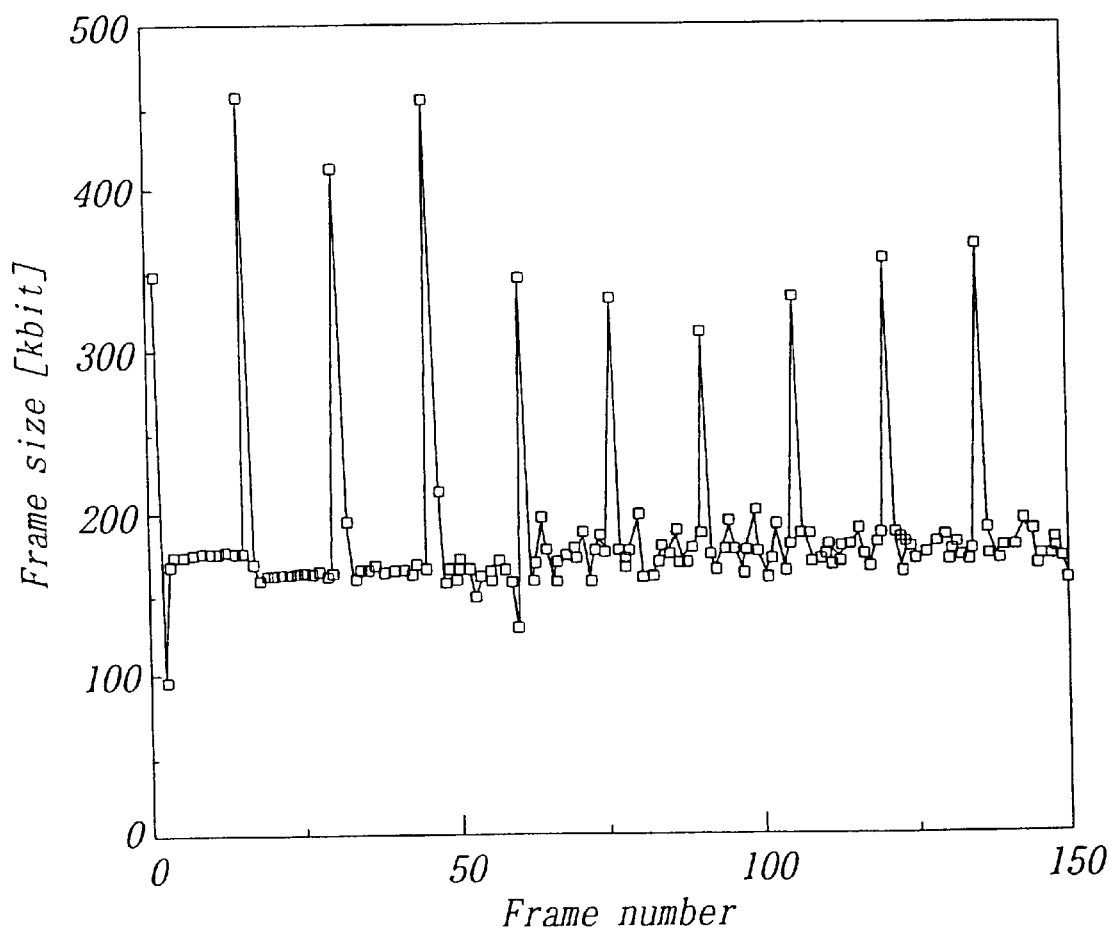
FIG. 3 is a graph representing a distribution of frame sizes of a MPEG2 stream.
Figure 4:
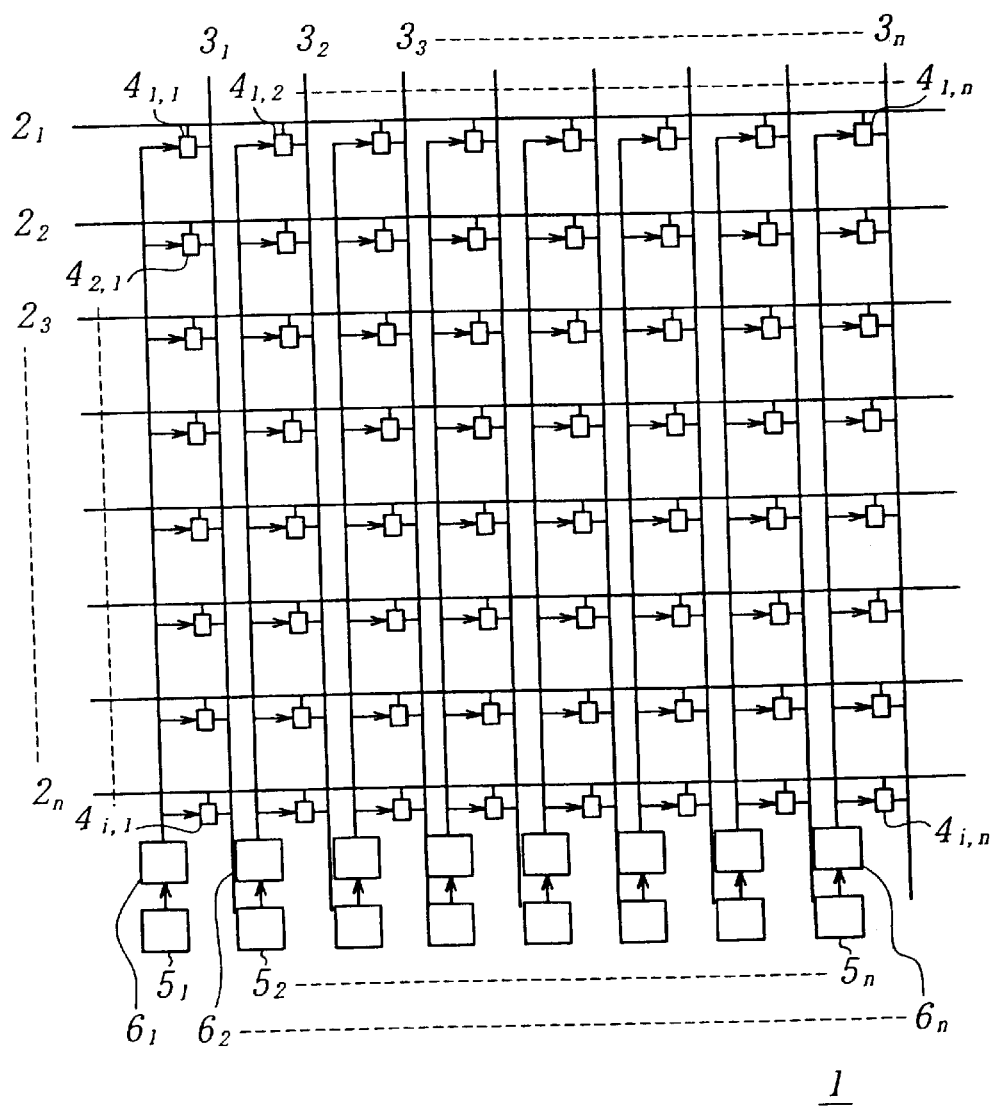
FIG. 4 is a schematic view showing a principle of an embodiment of the variable rate digital switching system according to the present invention.

FIG. 4 is a schematic view showing a principle of an embodiment of the variable rate digital switching system according to the present invention. A switch 1 comprises incoming line (hereinafter, referred to as input line) TDM buses $2_i$ (i=1, . . . n) and sending line (hereinafter, referred to as output line) TDM buses $3_j$ (j=1, . . . ,m) arranged in a latticed form, cross-point buffers $4_{i,j}$ each provided at cross-points of the input Line TDM buses and the output Line TDM buses, contents analyzers $5_j$ each connected to the all cross-point buffers related to each of the output Lines and schedulers $6_j$ each connected to the cross-point buffers.

Figure 5:
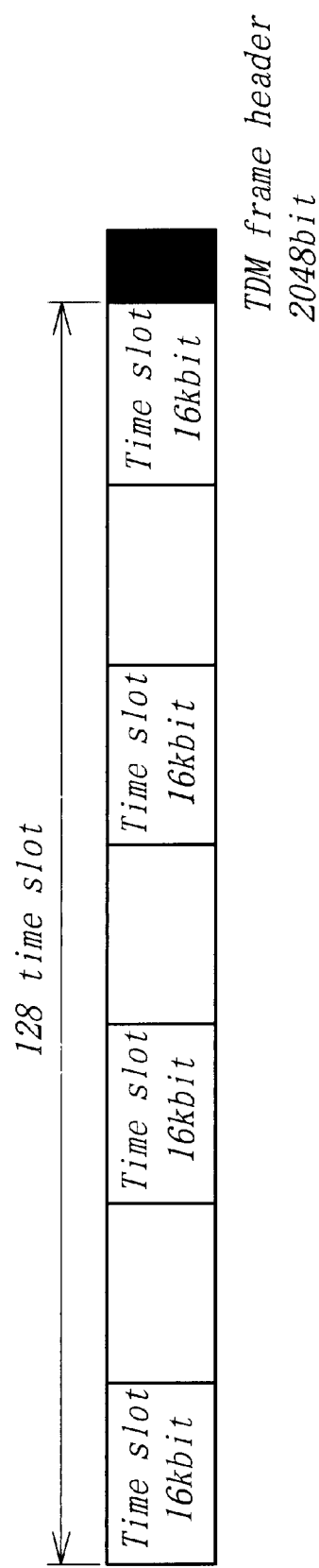
FIG. 5 is a diagram showing an example of a format of TDM frame applied to the variable rate digital switching system showed in FIG. 4.

FIG. 5 is a diagram showing an example of a format of the TDM frame used in the variable rate digital switching system shown in FIG. 4. Usually the time slot length of the TDM frame is about 1 octet and the TDM frame period is about 125 $\mu$m. However, in case of the video traffic, the longer frame length improves the efficiency and facilitates to increase the capacity. Because the video frame period is 33 ms, for example, if the time slot length is 16 kbit and TDM frame period is 3.3 ms (in case of 622.08 Mbps of transmission rate), the TDM frame period is a divisor of the video flame period so that the correspondence between the TDM frame period and the video frame period can be performed.

This correspondence makes possible a control for optimizing a quality of the video in the switch. Therefore, as compared with the conventional switching systems (TDM switching system, ATM switching system, packet switching system or the like), even if qualities of networks are identical, the quality of the video can be improved.

Now returning to FIG. 4, the operation of the variable rate digital switching system according to the invention is described by way of example. If the TDM frame as shown in FIG. 5 is transmitted, the input Line TDM buses and the output Line TDM buses are made high speed TDM buses having about 155 Mbps–50 Gbps of the transmission rate.

When TDM frames as shown FIG. 5 are inputted periodically into each of the cross-point buffers from the input Line TDM buses. The frame header of the TDM frame contains the information about the destination and the contents, that is, the type of each of the data contained in the time slots of the TDM frame. The cross-point buffer $2_{ij}$ checks the frame header and buffers only the data contained in the time slots destined for the output line $3_j$. The contents analyzer checks the frame header and distinguishes the types and the destinations of the data stored in the cross-point buffer. For example, in case of the MPEG2, the type of the picture (I picture, P picture or B picture) is distinguished. Priority levels are determined to the types, respectively. Then the contents analyzer sends a data for scheduling to the scheduler. The data includes the numbers of the time slots stored in the cross-point buffer according to the priority levels. The scheduler determines the scheduling in which the data stored in the cross-point buffers on the same output line are putted into the time slots of the output TDM frame depending on the data.

The scheduling can be determined in various ways.

A first scheduling method is that the time slots in the output TDM frame on the output line of destination are assigned to the related cross-point buffers in order of decreasing length of queue. The length of queue is the amount of the data stored. The scheduler recognizes the numbers of the time slot stored in the cross-point buffers on the same output line according to the priority levels from the data received from the cross-point buffers. The scheduler assigns the right to use of the time slot to the buffers in order of decreasing the number of the time slot stored according to the priority levels. In this way, the time slot loss caused by the overflow of the cross-point buffer is minimized.

A second scheduling method is that the time slots in the output TDM frame on the output line are assigned to the cross-point buffers relating to the said output line in order of increasing an amount of the data buffered. In this way, the average of the buffering delay of the time slot is minimized.

A third scheduling method is that the time slots in the output TDM frame on the output line are assigned to the cross-point buffers relating to the said output line in accordance with the round robin method. In this way, the maximum delay time of the timeslot can be guaranteed.

A forth scheduling method is that the time slots in the output TDM frame on the output line are assigned randomly to the cross-point buffers relating to the said output line.

What is claimed is:

1. A variable rate digital switching system comprising steps of:
   arranging a plurality of incoming TDM buses and a plurality of sending TDM buses in lattice form;
   providing cross-point buffers at cross-points of the incoming buses and the sending buses;
   connecting the cross-point buffers belonging to respective sending TDM buses to respective scheduler;
   checking frame header of input TDM frames by respective cross-point buffers, thereby buffering only data of time slot of destined and belonged sending bus and transmitting contents of the frame header to the scheduler;
   performing the scheduling by the scheduler as for how time slots in the sending TDM frame is allocated in respective cross-point buffers according to the contents of the frame header; and
   inputting in turn the buffered data in the own-allocated time slots of the sending TDM frame according to the scheduling by the respective cross-point buffer, and outputting them from the sending TDM bus.

2. A variable rate digital switching system comprising steps of:
   arranging a plurality of incoming TDM buses and a plurality of sending TDM buses in lattice form;
   providing cross-point buffers at cross-points of the incoming buses and the sending buses;
   connecting the cross-point buffers belonging to respective sending TDM buses to respective scheduler;
   connecting respective contents analyzer to respective scheduler;
   checking frame headers of input TDM frames by respective cross-point buffers, thereby buffering only data of time slot of destined and belonged sending bus and transmitting contents of the frame header to the contents analyzer;
   checking the frame header by the contents analyzer, thereby deciding the contents of data stored in the respective cross-point buffers on the own-belonged sending TDM bus, and informing them to the scheduler;
   performing the scheduling by the scheduler as for how time slots in the sending TDM frame is allocated in respective cross-point buffers according to the contents of the frame header and an amount of data stored in respective cross-point buffer; and
   inputting in turn the buffered data in the own-allocated time slots of the sending TDM frame according to the scheduling by respective cross-point buffer, and outputting them from the sending TDM bus.

3. A variable rate digital switching system as claimed in claim 1, characterized in that the scheduler determines the scheduling in that the time slots in the output TDM frame are assigned in turn from the cross-point buffers of the longest length of queue for the cross-point buffers of the sending line.

4. A variable rate digital switching system as claimed in claim 1, characterized in that the scheduler determines the scheduling in that the timeslots in the output TDM frame assigned are in turn from the cross-point buffers of the shortest length of queue for the cross-point buffers of the sending line.

5. A variable rate digital switching system as claimed in claim 1, characterized in that the scheduler determines the scheduling according to the round robin method for the cross-point buffers of the sending line.

6. A variable rate digital switching system as claimed in claim 1, characterized in that the scheduler determines randomly the scheduling for the cross-point buffers of the sending line.

7. A variable rate digital switching system as claimed in one of the claim 1, characterized in that the time slot length of the TDM frame is 16 kbit and the frame period of the TDM frame is a divisor of a video frame period of an input video signal contained in the TDM frames.

* * * * *